US012460273B1

(12) United States Patent
Hoffman

(10) Patent No.: US 12,460,273 B1
(45) Date of Patent: Nov. 4, 2025

(54) LEATHER BURNISHING TOOL

(71) Applicant: Christopher Hoffman, Bayonne, NJ (US)

(72) Inventor: Christopher Hoffman, Bayonne, NJ (US)

(*) Notice: Subject to any disclaimer, the term of this patent is extended or adjusted under 35 U.S.C. 154(b) by 0 days.

(21) Appl. No.: 18/777,577

(22) Filed: Jul. 19, 2024

(51) Int. Cl.
*C14B 19/00* (2006.01)
*C14B 11/00* (2006.01)

(52) U.S. Cl.
CPC .............. *C14B 19/00* (2013.01); *C14B 11/00* (2013.01); *C14B 2700/14* (2013.01)

(58) Field of Classification Search
CPC ..... C14B 11/00; C14B 19/00; C14B 2700/14; A43D 95/22; A43D 95/16
USPC .............................................................. 69/20
See application file for complete search history.

(56) References Cited

U.S. PATENT DOCUMENTS 95,779 A * 10/1869 Cunningham ............ C14B 1/00 69/21
215,705 A * 5/1879 Wood ...................... C14B 11/00 69/17
286,128 A * 10/1883 Gordon .................. A43D 95/20 12/77
316,867 A * 4/1885 Beaudry .............. A43D 25/066 12/127
356,839 A * 2/1887 Hutchinson ............. C14B 11/00 12/51
377,574 A * 2/1888 Patch ..................... A43D 95/20 12/77
446,923 A * 2/1891 Miller ....................... C14B 9/00 69/17
544,399 A * 8/1895 Arnold ...................... C14B 1/00 69/8
761,696 A * 6/1904 McCarter et al. ...... C14B 11/00 69/7.7
1,042,607 A * 10/1912 Schneider .............. A43D 87/00 12/92
1,253,650 A * 1/1918 Van Guelpen .......... C14B 11/00 69/7.7
1,280,710 A * 10/1918 Glass ...................... C14B 11/00 69/7.7
1,317,452 A * 9/1919 Packard .................. C14B 11/00 69/7.7
1,339,776 A * 5/1920 Merrick .................. C14B 11/00 12/146 CK
1,362,762 A * 12/1920 Van Guelpen .......... C14B 11/00 69/7.7

(Continued)

OTHER PUBLICATIONS

Just Wood: Leather Burisher Bundle, https://web.archive.org/web/20240416150523/https://www.justwood.com/buy/leather-burnisher-bundle-with-motor-drum-sander_167.htm, Apr. 16, 2024 (Year: 2024).*

*Primary Examiner* — Heather Mangine
(74) *Attorney, Agent, or Firm* — Gearhart Law LLC

(57) ABSTRACT

A leather burnishing tool is described. The tool has a central body portion that may be held by a user and a working portion on at least one end. In a preferred embodiment, the central body portion has two working portions. Each working portion is configured to snap into or otherwise securely engage the central body. Each working portion preferably has at least one and more preferably two shaping channels configured to burnish or shape leather. The tool is preferably continuously slid along the edge (or the leather slid along the shaping channel(s)) of the piece of leather to shape the edge of the piece of leather.

10 Claims, 13 Drawing Sheets

(56) References Cited

U.S. PATENT DOCUMENTS

| | | | | | | |
|---|---|---|---|---|---|---|
| 1,365,389 | A | * | 1/1921 | Feige | C14B 11/00 | 69/7.7 |
| 1,417,202 | A | * | 5/1922 | Puls | A43D 95/20 | 12/77 |
| 1,423,051 | A | * | 7/1922 | Van Guelpen | C14B 11/00 | 69/7.7 |
| 1,423,052 | A | * | 7/1922 | Van Guelpen | A43D 95/22 | 69/7.7 |
| 1,618,183 | A | * | 2/1927 | Cutler | A43D 95/22 | 219/215 |
| 1,621,515 | A | * | 3/1927 | Merrick | C14B 11/00 | 12/1 R |
| 1,630,564 | A | * | 5/1927 | Fowler | A43D 95/22 | 12/42.5 |
| 1,730,401 | A | * | 10/1929 | Woodcock | A43D 95/24 | 12/79.5 |
| 1,734,365 | A | * | 11/1929 | Collins | C14B 9/00 | 69/17 |
| 1,743,183 | A | * | 1/1930 | Barclay | A43D 95/22 | 492/26 |
| 1,782,802 | A | * | 11/1930 | Bazzoni | A43D 95/20 | 12/77.5 |
| 1,829,492 | A | * | 10/1931 | Rettman | C14B 11/00 | 69/17 |
| 1,915,928 | A | * | 6/1933 | Harrington | A43D 95/20 | 118/252 |
| 1,920,253 | A | * | 8/1933 | Glass | C14B 11/00 | 69/7 |
| 1,937,819 | A | * | 12/1933 | Hallam | A43D 95/24 | 12/78 |
| 1,986,969 | A | * | 1/1935 | Booth | A43D 95/24 | 12/78 |
| 2,177,785 | A | * | 10/1939 | Pestel | H03K 4/12 | 156/254 |
| 2,301,210 | A | * | 11/1942 | Hamann | A43D 95/22 | 12/78 |
| 2,416,289 | A | * | 2/1947 | Cross | C14B 1/44 | 493/271 |
| 2,571,149 | A | * | 10/1951 | Maciejowski | C14B 1/38 | 69/48 |
| 2,571,792 | A | * | 10/1951 | Tosi | C14B 11/00 | 69/7.5 |
| 2,795,975 | A | * | 6/1957 | Stoner | B24D 15/082 | 76/89.2 |
| 2,814,094 | A | * | 11/1957 | Hanna | B23D 43/02 | 407/13 |
| 3,043,065 | A | * | 7/1962 | Terrel | B24D 13/20 | 15/230.12 |
| 3,384,913 | A | * | 5/1968 | Comeau | A43D 95/22 | 12/92 |
| 3,397,415 | A | * | 8/1968 | Keller | A43D 25/06 | 12/86.65 |
| 3,722,021 | A | * | 3/1973 | Brainerd | B01F 35/713 | 206/229 |
| 3,952,389 | A | * | 4/1976 | Corder | A44C 17/043 | 29/90.01 |
| 4,118,846 | A | * | 10/1978 | Korte | B24B 39/04 | 29/90.01 |
| 4,127,063 | A | * | 11/1978 | Peterson | C14B 1/56 | 101/316 |
| 4,924,576 | A | * | 5/1990 | Schiller | C14B 19/00 | 30/367 |
| 4,993,243 | A | * | 2/1991 | Guinn | B23Q 11/06 | 69/37 |
| 5,027,621 | A | * | 7/1991 | Schiller | C14B 5/04 | 83/858 |
| 5,941,101 | A | * | 8/1999 | Callo | B24B 9/002 | 69/17 |
| 2015/0068044 | A1 | * | 3/2015 | Watt | B26B 27/00 | 30/169 |
| 2022/0106650 | A1 | * | 4/2022 | Hoffman | C14B 11/00 | |

* cited by examiner

LEATHER BURNISHING TOOL

FIELD OF THE EMBODIMENTS

The field of the invention and its embodiments relate to leather burnishing tools. In particular, the present invention describes a leather burnishing tool that can be slid along a flat plane or horizontal surface, while maintaining consistent pressure along an edge of a piece of leather to shape and smooth the edge of the piece of leather to a profile of the leather burnishing tool.

BACKGROUND OF THE EMBODIMENTS

When a piece of leather is cut to size or pattern, a raw edge is left that is rough or unfinished in appearance and frequently has a different color than the surface of the material. Various methods may be employed for producing a finished edge to the piece of leather. In some examples, this may occur by skiving the edge of the leather workpiece and then turning over or folding the skived edge, such as what is done in the manufacture of boots and shoes. Another method includes shrinking the flesh side of a piece of leather by applying heat and pressure to the end such that the grain surface of the leather curls to such an extent that it will completely hide the raw edge in the finished work. In other examples, burnishing may be used, which is the process of polishing something, such as leather, by rubbing the leather, resulting in a smooth and shiny surface of the leather.

However, what is needed is an improved leather burnishing tool that can be slid along a flat plane or horizontal surface, while maintaining consistent pressure along an edge of a piece of leather to shape and smooth the edge of the piece of leather to a profile of the leather burnishing tool.

Examples of Related Art

GB 704142 A describes a burnishing tool for finishing the trimmed edges of leather surfaces. U.S. Pat. No. 2,571,149 A describes improvements in or relating to rolling or smoothing devices. U.S. Pat. No. 2,177,785 A describes a method for producing a finished edge for a piece of leather. GB 452433 A describes improvements in or relating to machines for finishing the edges of sheet material, such as leather. GB 663986 A describes a burnishing machine for boots and shoes. U.S. Pat. No. 1,423,052 A describes another leather burnishing tool. CA 443797 A describes a seam-beading process.

Some leather burnishing tools exist in the art. However, their means of operation are substantially different from the present disclosure, as the other inventions fail to solve all the problems taught by the present disclosure.

SUMMARY OF THE EMBODIMENTS

The present invention and its embodiments relate to leather burnishing tools. In particular, the present invention describes a leather burnishing tool that can be slid along a flat plane or horizontal surface, while maintaining consistent pressure along an edge of a piece of leather to shape and smooth the edge of the piece of leather to a profile of the leather burnishing tool.

A first embodiment of the present invention describes a leather burnishing tool. The leather burnishing tool may include a first end disposed opposite a second end. A body portion of the leather burnishing tool is disposed between the first end and the second end. The body portion may be cylindrical, substantially cylindrical, rectangular, or square in shape. However, it should be appreciated that the shape of the body is not limited to the shapes explicitly described herein.

The first end of the leather burnishing tool includes a first channel and a top portion. The top portion of the leather burnishing tool may include a snap button top portion, for example. The second end of the leather burnishing tool includes a second channel configured to accept an edge of a piece of leather therein and a bottom portion configured to be flush with a horizontal surface or plane.

The second channel of the leather burnishing tool is a polished channel. A size of the second channel is in a range of approximately 1 mm to approximately 6 mm to accommodate thicker cow leather. In preferred examples, the size of the second channel is in the range of approximately 1 mm to approximately 2 mm. In some examples, the second channel of the leather burnishing tool comprises a round shape. In other examples, the second channel of the leather burnishing tool may be any shape. In an illustrative example, the second channel of the leather burnishing tool comprises a hex shape. In other examples, the second channel is flush with the bottom portion. In alternative examples, the second channel comprises a smooth tapered portion such that the second channel is not flush with the bottom portion.

In some examples, the leather burnishing tool may be configured to engage a tool holder. The tool holder includes a first end disposed opposite a second end and a body portion disposed between the first end and the second end. The first end of the tool holder includes an opening that is configured to engage the first channel of the leather burnishing tool to affix the tool holder to the leather burnishing tool. The second end of the tool holder includes a handle component configured to be held in a hand of a user. The tool holder is affixed to the leather burnishing tool via a mechanism, such as a snap button mechanism, a spring clip mechanism, a magnetic mechanism, or an adhesive mechanism, among other examples not explicitly listed herein.

The leather burnishing tool and/or the components of the leather burnishing tool may comprise a plastic material, a metal material, and/or a wood material, among other examples not explicitly listed herein. In examples, a width of the leather burnishing tool is approximately ¼ of an inch and a height of the leather burnishing tool is in a range of approximately ¼ of an inch to ½ of an inch. In additional examples, the leather burnishing tool is affixed to a fixed object, where the fixed object is flush with a horizontal surface or plane, such as a tabletop.

A second embodiment of the present invention describes a method to use the leather burnishing tool to shape an edge of the piece of leather. The method may include numerous process steps, such as: applying a material to the edge of the piece of leather. The material may be gum tragacanth, beeswax, water, and/or saddle soap, among other materials not explicitly listed herein. In some examples, this process step may not be used. The method may optionally include conditioning the piece of leather with an oil, such as jojoba oil. The method may then include: placing the edge of the piece of leather in the second channel of the leather burnishing tool, such that the bottom portion of the leather burnishing tool is flush with the horizontal surface. Next, the method includes: continuously sliding the leather burnishing tool along the edge of the piece of leather to shape the edge of the piece of leather. In examples where the leather burnishing tool comprises the tool holder, the method may include holding the handle component of the tool holder in a hand of a user while continuously sliding the leather burnishing tool along the edge of the piece of leather to shape the edge of the piece of leather.

In yet another embodiment of the present invention, there is a leather burnishing tool having a body with a first receiving portion and a second receiving portion; and at least one leather burnishing device configured to engage the first receiving portion or the second receiving portion, the at least one leather burnishing device comprising a first burnishing channel, a second burnishing channel, and a burnishing body.

Further, in other embodiments, there is a leather burnishing tool having a body with a first receiving portion and a second receiving portion, wherein the body has one or more planar surfaces; and at least one leather burnishing device configured to engage the first receiving portion or the second receiving portion, the at least one leather burnishing device comprising a first burnishing channel, a second burnishing channel, and a burnishing body, wherein the burnishing body has a first rounded side and a second planar side, wherein the second planar side is configured to engage the first receiving portion or the second receiving portion, and wherein the first burnishing channel and the second burnishing channel have a width that is narrower than a width of the burnishing body.

Even further, there is a leather burnishing tool having a body with a first receiving portion and a second receiving portion, wherein the body has one or more planar surfaces; a first leather burnishing device configured to engage the first receiving portion, the first leather burnishing device comprising a first burnishing channel, a second burnishing channel, and a burnishing body, wherein the burnishing body has a first rounded side and a second planar side, wherein the second planar side is configured to engage the first receiving portion, and wherein the first burnishing channel and the second burnishing channel have a width that is narrower than a width of the burnishing body; and a second leather burnishing device configured to engage the second receiving portion, the second leather burnishing device comprising a first burnishing channel, a second burnishing channel, and a burnishing body, wherein the burnishing body has a first rounded side and a second planar side, wherein the second planar side is configured to engage the second receiving portion, and wherein the first burnishing channel and the second burnishing channel have a width that is narrower than a width of the burnishing body.

DESCRIPTION OF THE PREFERRED EMBODIMENTS

Figure 1:
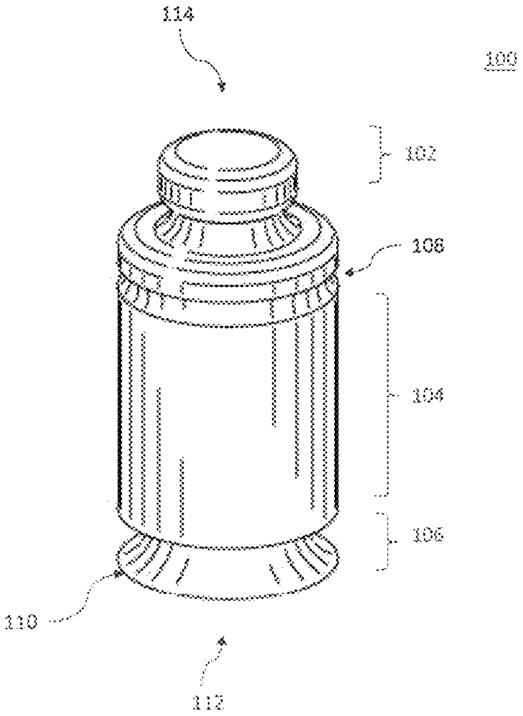
FIG. 1 depicts a schematic diagram of a leather burnishing tool, according to at least some embodiments disclosed herein.

The preferred embodiments of the present invention will now be described with reference to the drawings. Identical elements in the various figures are identified with the same reference numerals. Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

A leather burnishing tool 100 may be used to polish something, such as an edge of a piece of leather 116, by rubbing a portion of the leather burnishing tool 100 against the edge of the piece of leather 116, resulting in a smooth and shiny surface for the edge of the piece of leather 116. One such leather burnishing tool 100 is depicted and described herein.

Figure 2:
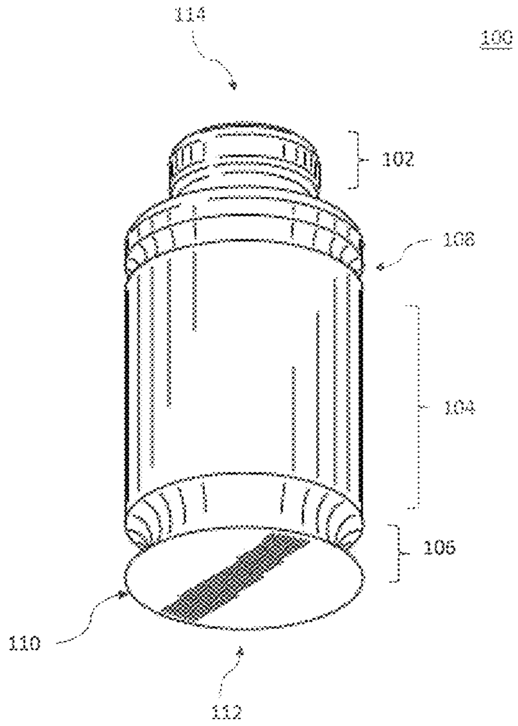
FIG. 2 depicts another schematic diagram of a leather burnishing tool, according to at least some embodiments disclosed herein.
Figure 3:
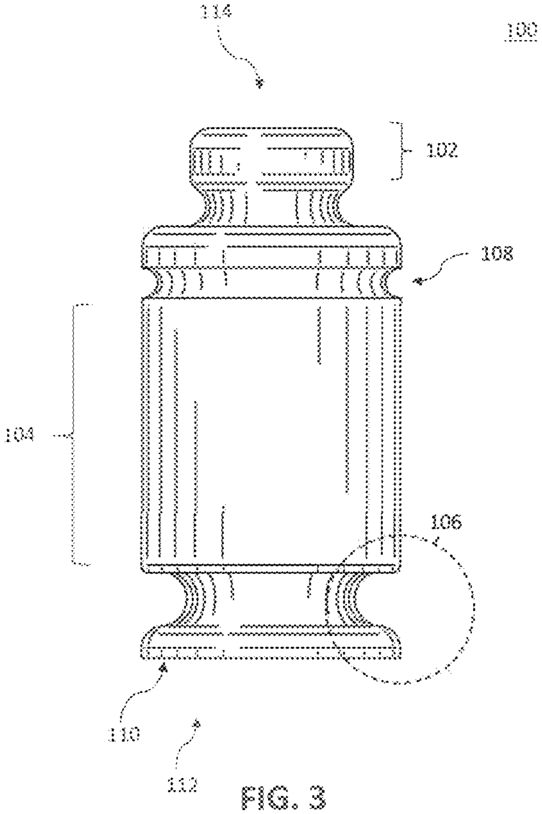
FIG. 3 depicts another schematic diagram of a leather burnishing tool, according to at least some embodiments disclosed herein.

The leather burnishing tool 100 (of FIG. 1, FIG. 2, and FIG. 3) may include a first end 114 disposed opposite a second end 112. A body portion 104 of the leather burnishing tool 100 is disposed between the first end 114 and the second end 112. The body portion 104 may be cylindrical (as depicted in FIG. 1, FIG. 2, and FIG. 3), substantially cylindrical, rectangular, or square in shape. It should be appreciated that the shape of the body portion 104 is not limited to those explicitly listed herein.

The first end 114 of the leather burnishing tool 100 includes a first channel 108 and a top portion 102. In some examples, the first channel 108 of the leather burnishing tool 100 is a spring clip channel. The top portion 102 of the leather burnishing tool 100 may include a snap button top portion, in examples. The second end 112 of the leather burnishing tool 100 includes a second channel 106 configured to accept an edge of a piece of leather 116 therein and a bottom portion 110 flush with a horizontal surface or plane, such as a tabletop.

The second channel 106 of the leather burnishing tool 100 is a polished channel. A size of the second channel 106 is in a range of approximately 1 mm to approximately 6 mm to accommodate thicker cow leather. In preferred examples, the size of the second channel 106 is in the range of approximately 1 mm to approximately 2 mm. In some examples, the size of the second channel 106 is approximately 1 mm. In other examples, the size of the second channel 106 is approximately 1.5 mm. In further examples, the size of the second channel 106 is approximately 2 mm. It should be appreciated that the size of the second channel 106 is not limited to the examples provided herein, as such examples are provided for illustrative purposes only.

Figure 4A:
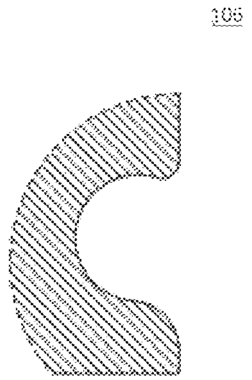
FIG. 4A depicts a schematic diagram of a channel of a leather burnishing tool, according to at least some embodiments disclosed herein.
Figure 4B:
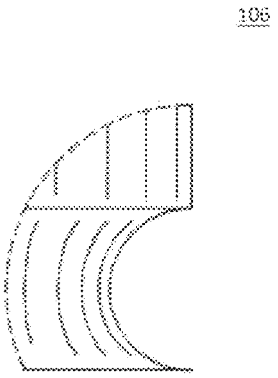
FIG. 4B depicts a schematic diagram of a first embodiment of a channel of a leather burnishing tool, according to at least some embodiments disclosed herein.
Figure 4C:
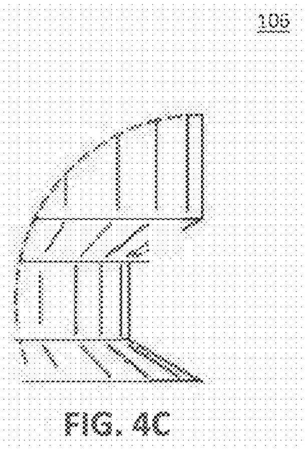
FIG. 4C depicts a schematic diagram of a second embodiment of a channel of a leather burnishing tool, according to at least some embodiments disclosed herein.

The second channel 106 is depicted in a circular broken line in FIG. 3. Various embodiments of the second channel 106 are depicted in FIG. 4A, FIG. 4B, and FIG. 4C. In some examples, the second channel 106 of the leather burnishing tool 100 comprises a round shape (as depicted in FIG. 4A and FIG. 4B). In other examples, the second channel 106 of the leather burnishing tool 100 comprises a hex shape (as depicted in FIG. 4C). In another example, the second channel 106 is flush with the bottom portion 110 (as depicted in FIG. 4B). In alternative examples, the second channel 106 comprises a smooth tapered portion such that the second channel 106 is not flush with the bottom portion 110.

Figure 5:
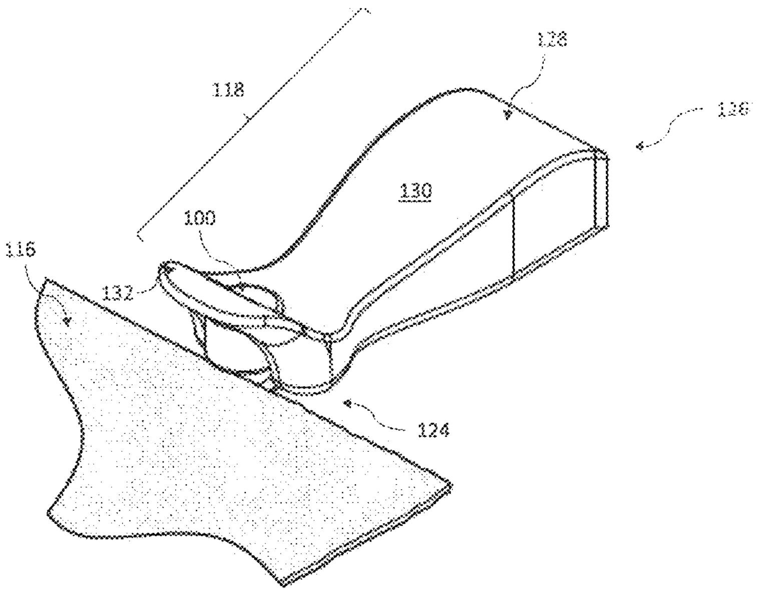
FIG. 5 depicts a schematic diagram of a first embodiment of a tool holder affixed to a leather burnishing tool, the leather burnishing tool being configured to accept, via a channel, an edge of a piece of leather, according to at least some embodiments disclosed herein.
Figure 6:
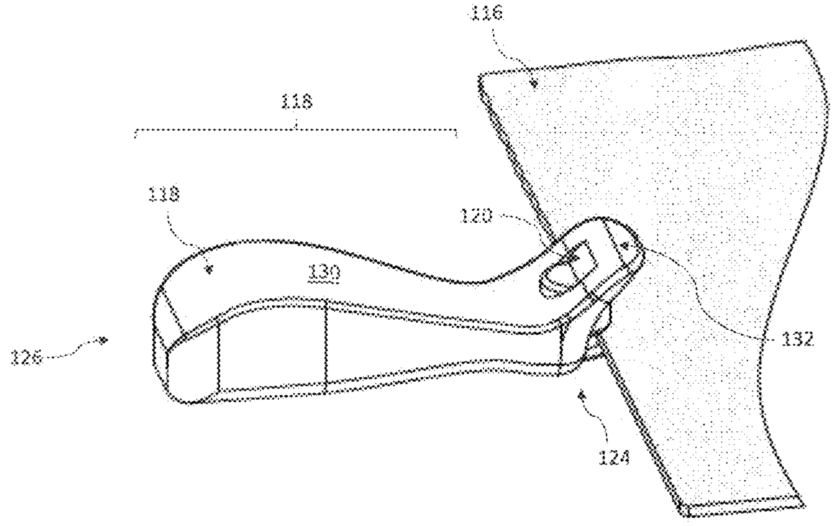
FIG. 6 depicts another schematic diagram of a first embodiment of a tool holder affixed to a leather burnishing tool, the leather burnishing tool being configured to accept, via a channel, an edge of a piece of leather, according to at least some embodiments disclosed herein.
Figure 8:
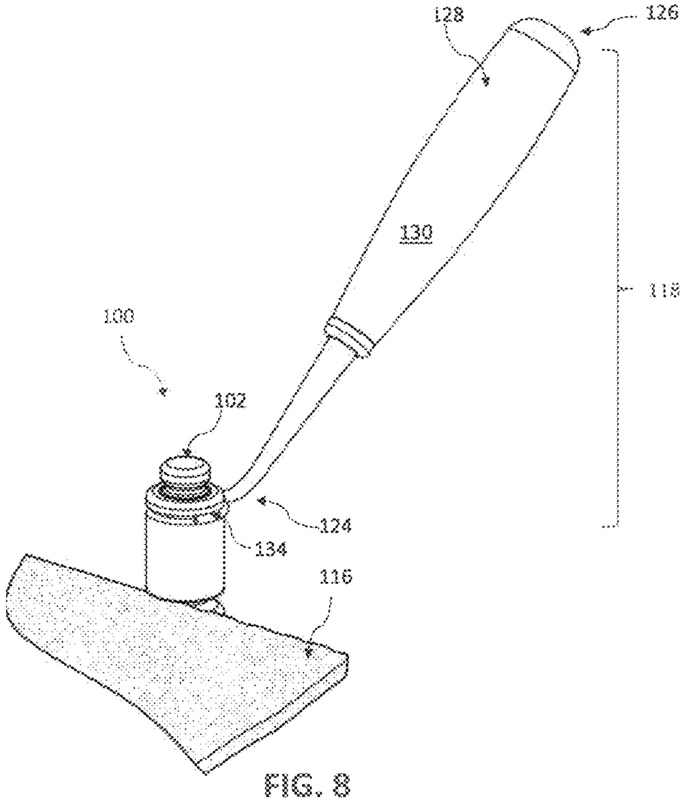
FIG. 8 depicts a schematic diagram of a second embodiment of a tool holder affixed to a leather burnishing tool, the leather burnishing tool being configured to accept, via a channel, an edge of a piece of leather, according to at least some embodiments disclosed herein.

In some examples, the leather burnishing tool 100 may be configured to engage a tool holder 118 (as depicted in FIG. 5, FIG. 6, and FIG. 8). The tool holder 118 is not limited to the examples described or depicted herein, as the examples are provided for illustrative purposes only. The tool holder 118 includes a first end 124 disposed opposite a second end 126. The tool holder 118 also includes a body portion 130 disposed between the first end 124 and the second end 126.

As depicted in FIG. 5 and FIG. 6, the body portion 130 may comprise a slope such that the second end 126 has a greater height than the first end 124. In some examples and as depicted in FIG. 5 and FIG. 6, the first end 124 may comprise a curved portion 132 that has a height greater than the height of the second end 126. The first end 124 of the tool holder 118 includes an opening 120 (as depicted in FIG. 6) that is configured to engage the first channel 108 of the leather burnishing tool 100 to affix the tool holder 118 to the leather burnishing tool 100.

In other examples and as depicted in FIG. 8, the body portion 130 may be substantially cylindrical or cylindrical in shape. As depicted in FIG. 8, the first end 124 of the tool holder 118 has a width smaller than the second end 126 of the tool holder 126. The first end 124 of the tool holder 118 of FIG. 8 includes a u-shaped component 134 receivable by the first channel 108 of the leather burnishing tool 100 to affix the tool holder 118 to the leather burnishing tool 100.

The second end 126 of the tool holder 118 includes a handle component 128 (as depicted in FIG. 5, FIG. 6, and FIG. 8). The handle component 128 is configured to be held in a hand of a user. The handle component 128 is not limited to any examples depicted herein, as such examples are provided for illustrative purposes only.

It should be appreciated that the tool holder 118 is affixed to the leather burnishing tool 100 via a mechanism, such as a snap button mechanism, a spring clip mechanism, or an adhesive mechanism, among other examples not explicitly listed herein. In some examples, the leather burnishing tool 100 or a portion of the leather burnishing tool 100 is magnetic such that the tool holder 118 is affixed to the leather burnishing tool 100 via a magnetic mechanism.

It should be appreciated that the leather burnishing tool 100 and/or the components of the leather burnishing tool 100 may comprise a plastic material, a metal material (such as brass), and/or a wood material, among other examples not explicitly listed herein. In examples, a width of the leather burnishing tool 100 is approximately ¼ of an inch and a height of the leather burnishing tool 100 is in a range of approximately ¼ of an inch to ½ of an inch. It should be appreciated that the width and height of the leather burnishing tool 100 is not limited to the examples provided herein.

Figure 7:
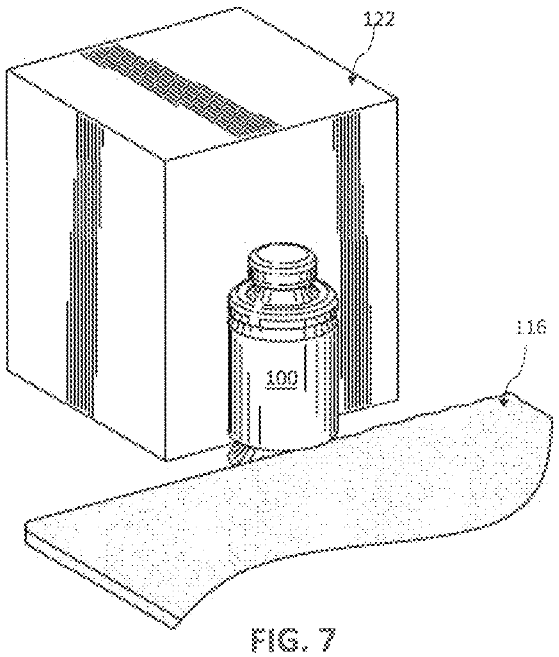
FIG. 7 depicts a schematic diagram of a leather burnishing tool being affixed to a fixed object, the fixed object being flush with a horizontal surface, where the leather burnishing tool is configured to accept, via a channel, an edge of a piece of leather, according to at least some embodiments disclosed herein.

In additional examples, the leather burnishing tool 100 is affixed to a fixed object 122 (as depicted in FIG. 7), where the fixed object 122 is flush with a flat plane or a horizontal surface, such as a tabletop. In examples, the fixed object 122 is a block of wood and the leather burnishing tool 100 is affixed to the fixed object 122 via an adhesive.

A method to use the leather burnishing tool 100 described herein to shape an edge of the piece of leather 116 may include numerous process steps, such as: applying a material to the edge of the piece of leather 116. The material may be gum tragacanth, beeswax, water, and/or saddle soap, among other materials not explicitly listed herein. The method may optionally include conditioning the edge of the piece of leather 116 with an oil, such as jojoba oil.

The method may then include: placing the edge of the piece of leather 116 in the second channel 106 of the leather burnishing tool 100, such that the bottom portion 110 at the second end 122 of the leather burnishing tool 100 is flush with the flat plane or the horizontal surface. The method then includes: continuously sliding the leather burnishing tool 100 along the edge of the piece of leather 116 to shape the edge of the piece of leather 116. Such continuous sliding creates friction to burnish the edge of the piece of leather 116. Further, sliding the leather burnishing tool 100 along the flat plane or the horizontal surface maintains consistent pressure along the edge of the piece of leather 116, smoothing the edge of the piece of leather 116 to the profile of the leather burnishing tool 100.

In examples where the leather burnishing tool 100 comprises the tool holder 118, the method may include holding the handle component 128 of the tool holder 118 in a hand of a user while continuously sliding the leather burnishing tool 100 along the edge of the piece of leather 116 to shape the edge of the piece of leather 116.

It should further be appreciated that in some examples, the leather burnishing tool 100 may be heated via an external source of heat (such as a heating pad or a heating gun, among other examples). In further examples, the leather burnishing tool 100 may be heated with a mini-heating element that is affixed to a holder or is present inside of the leather burnishing tool 100.

Figure 9:
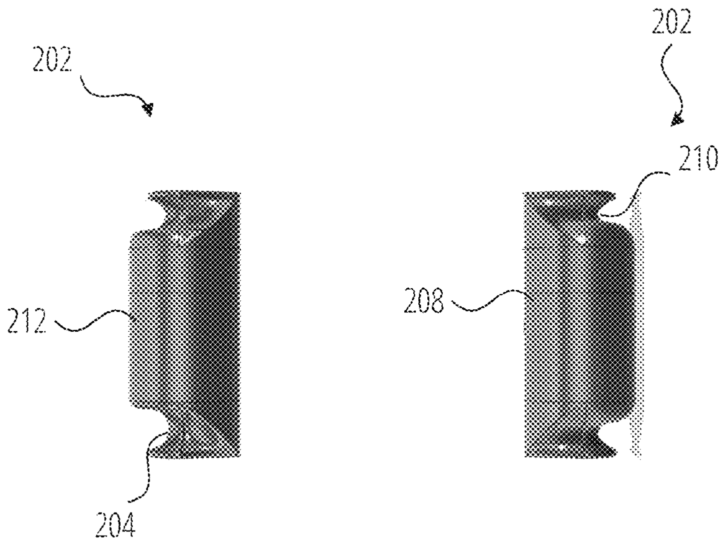
FIG. 9 depicts an alternative embodiment of a portion of a leather burnishing device.
Figure 10:
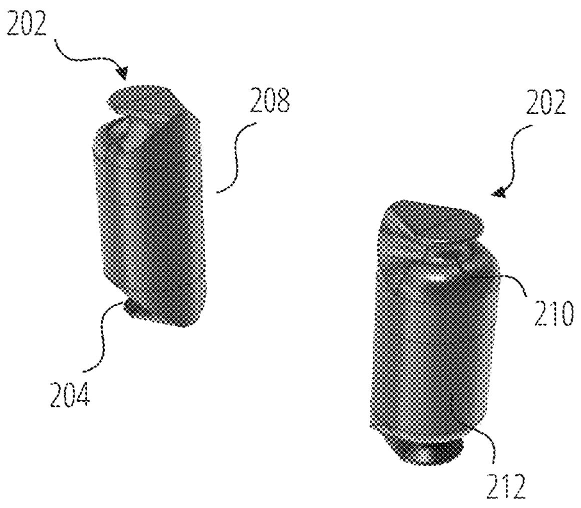
FIG. 10 depicts an alternative view of the embodiment shown in FIG. 9.
Figure 11:
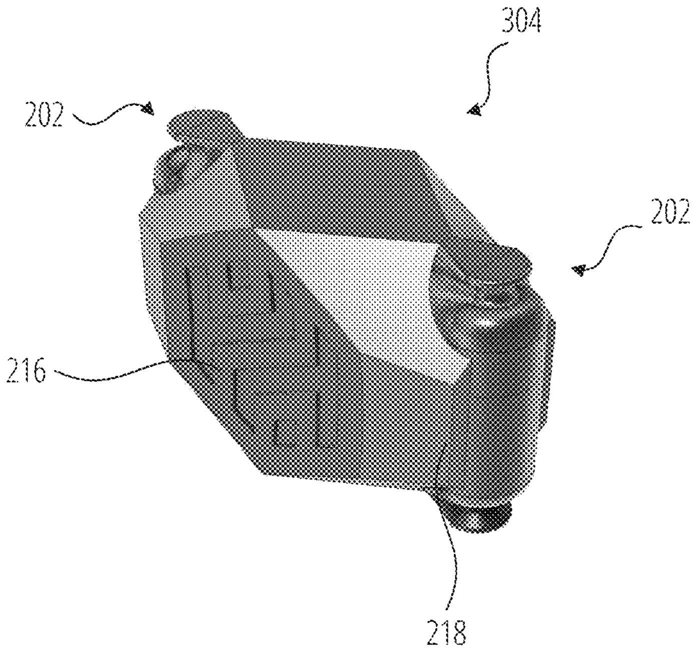
FIG. 11 depicts an alternative leather burnishing tool having removable and/or replaceable leather burnishing devices.

As shown in FIGS. 9-11, there is another embodiment of the present invention. Here there is a central body 304 which has one or more planar surfaces 216. Preferably, the planar surfaces 216 allow a user to grip the central body 304 or otherwise secure a position of the central body 304. The central body 304 may be hollow or solid in construction. Preferred materials may be polymers such as but not limited to polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. Other materials such as composites, woods or hardwoods, and certain metals may also be used. Composites may include but are not limited to fiber-reinforced plastics, metal composites, carbon fiber, Kevlar® and the like. Metals may comprise lightweight metals such as aluminum and other pure metals as well as various alloys.

The central body 304 further has receiving portions 218. There may be one or more receiving portions 218 in the central body 304. In some embodiments, there are more receiving portions 218 than the two shown in FIG. 11. Each receiving portion 218 may be substantially similar or different (height, length, width, curvature, etc.) than any other receiving portions present in the central body 304. Each receiving portion 218 may be generally semi-circular with wings or protrusions that emanate from the central body 304. These protrusions allow for the receiving portions to selectively retain the leather burnishing device(s) 202 associated with the present embodiment. In a preferred embodiment, the receiving portions 218 frictionably engage the leather burnishing devices 202. However, other mechanisms of adherence generally known in the art may also be employed to achieve the same end result. The receiving portions 218 should generally be shaped and configured to allow the leather burnishing devices 202 to be removable from the receiving portions 218 thereby lending variety and modularity to the device as a whole.

The leather burnishing devices 202 are shaped to engage and, on at least one surface, fit into the receiving portions 218 and sit flush with a rear of the receiving portions 218. As shown in FIGS. 9 and 10, the leather burnishing devices 202 have a first side 212, second side 208, first burnishing channel 204 and a second burnishing channel 210. Each of the two leather burnishing devices 202 as shown are substantially identical. However, the central body 304 may be selectively joined with any configuration of leather burnishing devices under the purview of the present invention.

Each leather burnishing device 202 has a height and a width and is preferably comprised of a metal or other material suitable to shape or burnish leather. At or near a top of the leather burnishing device 202 is a first burnishing channel 210 and at or near a bottom of the leather burnishing device 202 is a second burnishing channel 204. Each of the two burnishing channels may be dimensionally identical or different from one another. Preferably each burnishing channel has a smooth arcuate shape that allows for the shaping of leather. In at least one embodiment it is preferable to have one channel configured for rough burnishing and another channel configured for fine burnishing.

Positioned between the first burnishing channel 210 and the second burnishing channel 204 is a burnishing body having a first surface 212 and a second surface 208. The first surface 212 may be more arcuate than the second surface 208 which may be more planar. However, the first surface 212 is generally shaped to be aesthetically pleasing and not obstruct access to the burnishing channels and second surface 208 primarily serves to engage and be retained by the receiving portion 218. A height of the burnishing body can vary depending on the dimensions of the central body 304 and the intended use of the burnishing tool as a whole. In each instance, the first burnishing channel 210 and the second burnishing channel 204 have a width than is less than a width of the burnishing body.

In practice, the central body 304 is preferably positioned on a surface with one or more leather burnishing devices 202 inserted into the one or more receiving portions 218. A piece of leather may then be passed through the first burnishing channel 210 and/or the second burnishing channel 204 a number of times until the desired edge is formed on the leather. In other embodiments, the leather may remain stationary while the leather burnishing device is held in hand and passed along the leather one or more times until the desired edge is formed on the leather.

It is to be noted that the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A leather burnishing tool comprising:

a body having a first receiving portion and a second receiving portion; and at least one leather burnishing device configured to engage the first receiving portion or the second receiving portion, the at least one leather burnishing device comprising a top end, a bottom end, a first rounded side extending between the top end and the bottom end, and a second planar side extending between the top end and the bottom end;

the first rounded side comprising a first burnishing channel located adjacent the top end, a second burnishing channel located adjacent the bottom end, and a burnishing body in between the first and second burnishing channels;

wherein the second planar side engages the first receiving portion or the second receiving portion such that the second planar side is flush with the first receiving portion of the second receiving portion.

2. The leather burnishing tool of claim 1 wherein the first burnishing channel and the second burnishing channel have a width that is narrower than a width of the burnishing body.

3. The leather burnishing tool of claim 1 wherein the at least one burnishing device comprises a first burnishing device and a second burnishing device, the first burnishing device engaging the first there are two leather burnishing devices with one leather burnishing device engaging the first burnishing channel receiving portion and the second another leather burnishing device engaging the second burnishing channel receiving portion.

4. The leather burnishing tool of claim 1 wherein the body has one or more planar surfaces.

5. A leather burnishing tool comprising:

a body having a first receiving portion and a second receiving portion, wherein the body has one or more planar surfaces; and at least one leather burnishing device configured to engage the first receiving portion or the second receiving portion, the at least one leather burnishing device comprising a first rounded side and a second planar side, the first rounded side comprising a first burnishing channel, a second burnishing channel, and a burnishing body, wherein the burnishing body has a first rounded side and a second planar side, wherein the second planar side is configured to engage the first receiving portion or the second receiving portion such that the second planar side is flush with the first receiving portion of the second receiving portion, and wherein the first burnishing channel and the second burnishing channel have a width that is narrower than a width of the burnishing body.

6. The leather burnishing tool of claim 5 wherein the first receiving portion and the second receiving portion are semi-circular each have wings that emanate from a central portion of the body.

7. The leather burnishing tool of claim 5 wherein the first receiving portion and the second receiving portion span a height of the body.

8. The leather burnishing tool of claim 5 wherein the at least one burnishing device comprises a first burnishing device and a second burnishing device, the first burnishing device engaging the first receiving portion and the second burnishing device engaging the second receiving portion.

9. A leather burnishing tool comprising:

a body having a first receiving portion and a second receiving portion, the first receiving portion and the second receiving portion each comprising wings that emanate from a central portion of the body, wherein the body has one or more planar surfaces;

a first leather burnishing device configured to engage the first receiving portion, the first leather burnishing device comprising a first burnishing channel, a second burnishing channel, and a burnishing body, wherein the burnishing body has a first rounded side and a second planar side, wherein the second planar side is configured to engage the first receiving portion, and wherein the first burnishing channel and the second burnishing channel have a width that is narrower than a width of the burnishing body.

10. The leather burnishing tool of claim 9, further comprising a second leather burnishing device configured to engage the second receiving portion, the second leather burnishing device comprising a first burnishing channel, a second burnishing channel, and a burnishing body, wherein the burnishing body of the second leather burnishing device has a first rounded side and a second planar side, wherein the second planar side of the second leather burnishing device is configured to engage the second receiving portion, and wherein the first burnishing channel of the second leather burnishing device and the second burnishing channel of the second leather burnishing device have a width that is narrower than a width of the burnishing body of the second leather burnishing device.

* * * * *